Feb. 18, 1941.  V. E. GRAY  2,232,523
ROTARY CULTIVATOR
Filed June 5, 1939   3 Sheets-Sheet 3

INVENTOR
V. E. Gray
BY
ATTORNEY

Patented Feb. 18, 1941

2,232,523

UNITED STATES PATENT OFFICE 2,232,523

ROTARY CULTIVATOR

Vivian E. Gray, Stockton, Calif.

Application June 5, 1939, Serial No. 277,338

6 Claims. (Cl. 97—40)

This invention relates to rotary cultivators such as are used in cultivating between the rows of relatively low row crops such as sugar beets.

The main object of my invention is to provide a cultivator of this general nature which is not only driven by but directly attached to a tractor in such a manner that ease of handling and turning is assured, turning within a very small radius is possible and one man can efficiently operate both the tractor and cultivator.

Another object is to provide a cultivator structure made up of two separate units which while driven in common from the tractor, may be independently moved into or out of operative position, so that one or both units may be in use, depending on the number of row spaces to be cultivated.

A further object is to provide a rotary cultivating element so shaped as to be capable of lifting over relatively rigid obstructions without damage.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
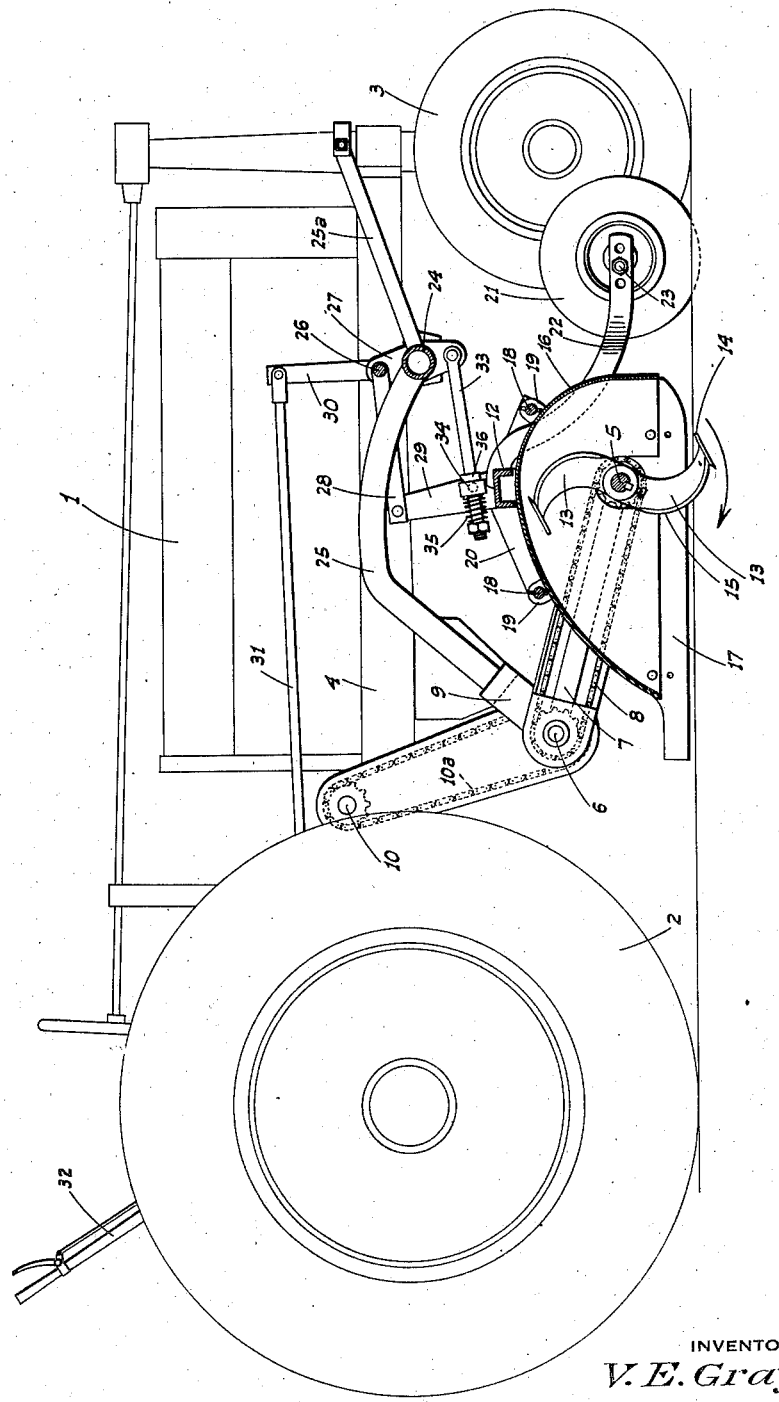
Figure 1 is a side elevation, partly in section, of my improved cultivator and tractor combination, showing the cultivator elements in operative position.
Figure 2:
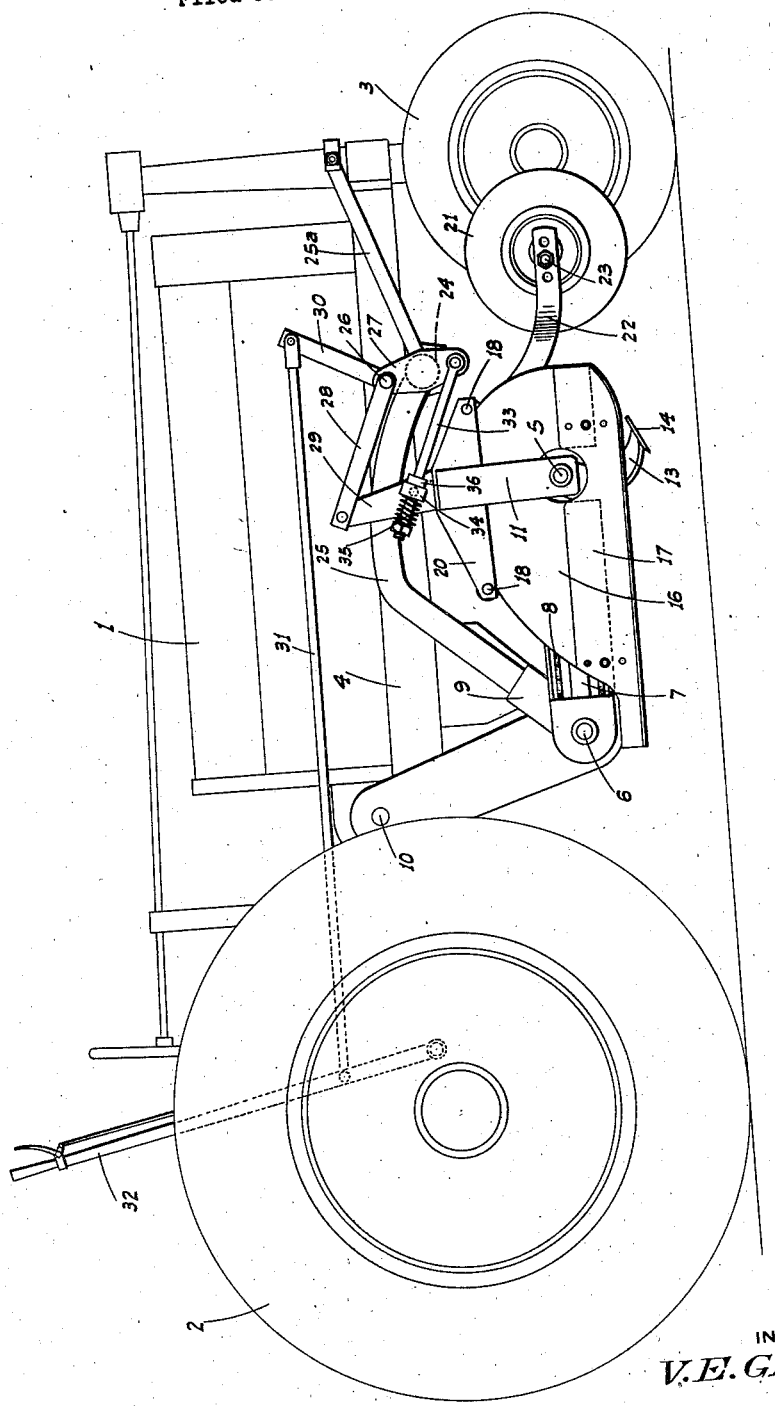
Figure 2 is a similar view showing the cultivator elements raised or in inoperative position.
Figure 3:
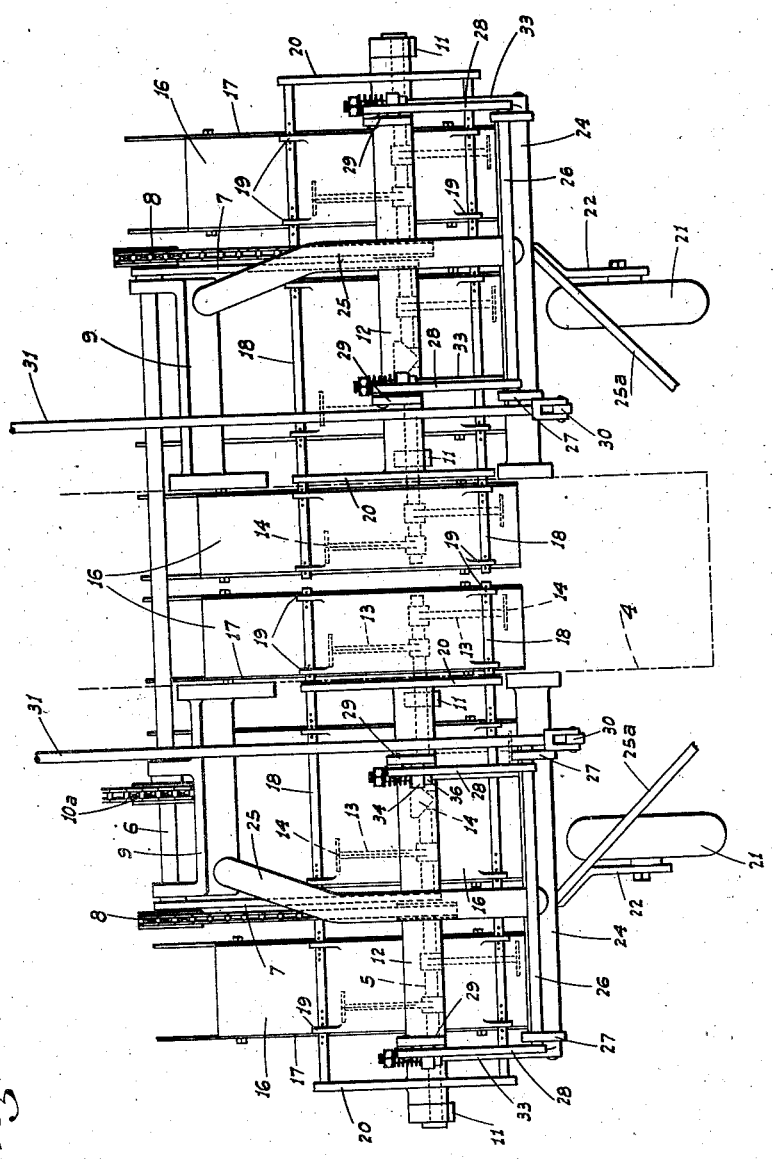
Figure 3 is a top plan view of the cultivator assembly, detached.

Referring now more particularly to the characters of reference on the drawings, the tractor 1 on which my cultivator is mounted is one of a standard high-clearance type, having rear widely spaced drive wheels 2, close coupled steerable front wheels 3 and a relatively narrow frame 4, this arrangement leaving a large unobstructed space both horizontally and vertically between the front and rear wheels and between the ground and frame. The cultivator structure, mounted on the tractor comprises a pair of alined but separate and independently controlled units, extending transversely of the tractor between the front and rear wheels and under the frame thereof.

Each unit comprises a horizontal transverse shaft 5, connected in swinging relation to a parallel countershaft 6 by radius bars 7 and driven from said shaft by a chain drive 8. The countershaft is common to both units, is disposed rearwardly of shafts 5, and is supported from the tractor frame 4 by suitable transverse bracket members 9 projecting laterally out from said frame. The shaft 6 is driven from the power take-off shaft 10 of the tractor by a chain drive 10a.

Each shaft 5 is journaled in hangers 11 rigid with and depending from a supporting beam 12 disposed some distance above and parallel to the shaft.

The shaft carries spaced sets of rotary cultivator elements each comprising an arm 13 projecting from the shaft and a triangular cutting blade 14 mounted on the outer end of the arm in a plane substantially at right angles to aline radially with the shaft. The leading edge of the arms is convexly curved and sharpened as indicated at 15 and the point of the blade is in line with the adjacent said sharpened edge. The shaft 5 is driven in a direction such that the blades move down into the dirt from ahead, and by reason of the shape of the arms and the position of the blades relative thereto as above described, the arms will roll over and lift from a rigid obstruction, if such is in the path of their downward travel, without damage to the arms and blade.

The arms are disposed in staggered relation to each other along the shaft, and the endmost sets of elements are arranged to each cultivate half the width of a space between adjacent rows of plants, while the intermediate unit is arranged to cultivate the entire space between adjacent rows. The different sets are spaced apart from each other sufficiently to avoid interfering with the plants in the rows. It will thus be seen that if both cultivator units are operating, three complete adjacent row spaces are cultivated and two half spaces at the ends, one or the other remaining half space being taken care of with the next trip of the machine along the field.

Each set of cultivator elements is enclosed in a housing 16 open only on the bottom, so as to prevent the dirt being thrown against the plants. Each housing is provided with vertically adjustable side skirts 17 which may be raised or lowered according to the depth of cultivating operations so that the skirts will always be practically flush with the surface of the ground. The housings are hung from rods 18 extending parallel to beam 12 on opposite sides thereof and which slidably engage ears 19 on the housings. The housings are adjustable along the rods, and since the cultivator elements are also adjustable along the shaft, the spacing of the sets of elements and their housings may be altered according to the spacing of the rows of plants, which sometimes vary. The rods 18 are supported from beam 12, so as to be rigid therewith, by plates 20 secured on and extending crosswise of said beam.

Each cultivator unit is supported from the ground in front by a wheel 21 adjustably mounted on an arm 22 extending upwardly to and secured on beam 12 between the outermost and adjacent housings. Vertical adjustment of the wheel relative to the arm, so as to provide for different cultivating depths, may be had by reason of the fact that the bolt 23 which clamps the wheel spindle to the arm, is offset from the axis of the wheel and being rotatable in said arm, the level of said axis relative to the arm may obviously be altered.

The cultivator units when in operation are supported from and follow the contour of the ground. In order to lift each unit clear, during transportation or making a turn at the end of the field, I provide the following structure:

Projecting laterally from and fixed on the frame 4 in front of and parallel to beam 12 is another beam 24 connected to and braced from member 9 by an arch beam 25 and also braced from the front of the tractor by diagonal elements 25a. A control shaft 26 above and parallel to beam 24 is turnable in ears 27 upstanding from said beam. Arms 28 rigid with shaft 26 extend rearwardly to pivotal connection with members 29 upstanding from and rigid with beam 12.

Another arm 30 projects upwardly from shaft 26, and is connected by a push rod 31 with a lever 32 mounted on the tractor at the back in a position convenient to the operator of the tractor from his seat thereon. It will therefore be seen that with a forward movement of the lever, the unit will be raised, swinging about the countershaft but with the lower edge of the housings remaining substantially parallel to the ground. This is due to the arrangement of the operating connections above described, and to the use of stabilizing links 33. These are disposed below and parallel to arms 28 and are pivoted at their forward end in connection with and below beam 24. At their rear end, the links slidably project through swivel eyes 34 mounted on members 29. Rearwardly of the eyes the links are provided with compression springs 35 acting to hold rigid collars 36 on the links against the forward side of the eyes.

Since the two units, while driven from the one countershaft, are entirely separate from each other and have their individual lifting mechanism, either one or the other, or both may be used at one time, as operating conditions may require.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rotary cultivator comprising a horizontal driven shaft, spaced sets of cultivating elements mounted on the shaft for adjustment along the same, housings separately enclosing the different sets and means supporting the housings for adjustment lengthwise of the shaft.

2. A rotary cultivator comprising a horizontal driven shaft, spaced sets of cultivating elements mounted on the shaft, a beam above the shaft clear of the path of rotation of the elements, means supporting the shaft from the beam, housings about the sets of elements disposed under the beam, rods parallel to the beam on opposite sides and above the housings, means supporting the rods in rigid connection with the beam and ears on the housings through which the rods project.

3. A rotary cultivator comprising a horizontal shaft, a plurality of cultivating elements on the shaft, a relatively fixed countershaft horizontally spaced from the first shaft, a radius rod connecting the shafts, a ground engaging wheel ahead of the elements, means supporting said first named shaft, means mounting the wheel in connection with said supporting means and means to raise and lower the cultivator while maintaining the first shaft and wheel at substantially the same level relative to each other.

4. A rotary cultivator comprising a horizontal shaft, a plurality of cultivating elements on the shaft, a relatively fixed countershaft horizontally spaced from the first shaft, a radius rod connecting the shafts, a ground engaging wheel ahead of the elements, means supporting said first named shaft, means mounting the wheel in connection with said supporting means and means applied to the shaft supporting means to raise and lower the cultivator while maintaining the same in substantially parallel relation to the ground.

5. A rotary cultivator including a horizontal shaft, cultivating elements on the shaft, a relatively fixed countershaft horizontally spaced from the first shaft, a radius rod connecting the shafts, a transverse beam mounted in connection with the first named shaft and means applied to the beam to raise and lower the cultivator while maintaining the same in substantially parallel relation to the ground.

6. A structure as in claim 5, in which said means comprises a member rigid with and upstanding from the beam, a rotary control shaft parallel to the cultivator shaft horizontally spaced from the member, an arm rigid with said control shaft pivoted on the member and a stabilizing link parallel to said arm pivoted at one end in a fixed position, a swivel eye on the member through which said link slidably projects, a stop on the link limiting sliding movement thereof in one direction and a compression spring between the eye and link yieldably holding the stop against the eye.

VIVIAN E. GRAY.